US009809666B2

(12) United States Patent
Hedesiu et al.

(10) Patent No.: US 9,809,666 B2
(45) Date of Patent: Nov. 7, 2017

(54) POLYPROPYLENE COMPOSITION WITH IMPROVED IMPACT RESISTANCE FOR PIPE APPLICATIONS

(71) Applicants: ABU DHABI POLYMERS COMPANY LIMITED (BOROUGE), Abu Dhabi (AE); BOREALIS AG, Vienna (AT)

(72) Inventors: Cristian Hedesiu, Abu Dhabi (AE); Kauno Alastalo, Porvoo (FI)

(73) Assignees: ABU DHABI POLYMERS COMPANY LIMITED (BOROUGE), Abu Dhabi (AE); BOREALIS AG, Vienna (AT)

( * ) Notice: Subject to any disclaimer, the term of this patent is extended or adjusted under 35 U.S.C. 154(b) by 0 days.

(21) Appl. No.: 14/781,186

(22) PCT Filed: Apr. 22, 2014

(86) PCT No.: PCT/EP2014/001068
§ 371 (c)(1),
(2) Date: Sep. 29, 2015

(87) PCT Pub. No.: WO2014/173530
PCT Pub. Date: Oct. 30, 2014

(65) Prior Publication Data
US 2016/0053034 A1 Feb. 25, 2016

(30) Foreign Application Priority Data
Apr. 22, 2013 (EP) .................... 13002099

(51) Int. Cl.
C08F 210/06 (2006.01)
C08L 23/16 (2006.01)
C08L 23/14 (2006.01)
F16L 9/12 (2006.01)
B29B 9/06 (2006.01)
C08J 5/00 (2006.01)
B29K 23/00 (2006.01)
B29K 105/00 (2006.01)

(52) U.S. Cl.
CPC ............ *C08F 210/06* (2013.01); *B29B 9/06* (2013.01); *C08J 5/00* (2013.01); *C08L 23/142* (2013.01); *F16L 9/12* (2013.01); *B29K 2023/06* (2013.01); *B29K 2023/12* (2013.01); *B29K 2105/0085* (2013.01); *B29K 2105/0094* (2013.01); *B29K 2995/0089* (2013.01); *C08J 2323/14* (2013.01); *C08L 2203/18* (2013.01); *C08L 2205/025* (2013.01); *C08L 2314/02* (2013.01)

(58) Field of Classification Search
CPC .. C08F 210/06; C08F 210/16; C08F 2500/05; C08F 2500/03; C08F 2500/12; C08F 2500/13; C08L 23/16; C08L 23/14; C08L 2205/02; C08L 2203/18; C08L 2314/02
See application file for complete search history.

(56) References Cited

U.S. PATENT DOCUMENTS

| 3,242,150 | A | 3/1966 | Scoggin |
| 3,324,093 | A | 6/1967 | Alleman |
| 3,374,211 | A | 3/1968 | Marwil et al. |
| 3,405,109 | A | 10/1968 | Rohlfing |
| 4,347,160 | A | 8/1982 | Epstein et al. |
| 4,382,019 | A | 5/1983 | Greco |
| 4,435,550 | A | 3/1984 | Ueno et al. |
| 4,465,782 | A | 8/1984 | McKenzie |
| 4,473,660 | A | 9/1984 | Albizzati et al. |
| 4,530,912 | A | 7/1985 | Pullukat et al. |
| 4,532,311 | A | 7/1985 | Fulks et al. |
| 4,543,399 | A | 9/1985 | Jenkins, III et al. |
| 4,560,671 | A | 12/1985 | Gross et al. |
| 4,578,879 | A | 4/1986 | Yokoyama et al. |
| 4,582,816 | A | 4/1986 | Miro |
| 4,621,952 | A | 11/1986 | Aronson |

(Continued)

FOREIGN PATENT DOCUMENTS

| EP | 0 250 169 | 12/1987 |
| EP | 0 188 125 | 5/1990 |
| EP | 0 560 035 | 9/1993 |
| EP | 0 579 426 | 1/1994 |
| EP | 0 479 186 | 3/1995 |
| EP | 0 684 871 | 12/1995 |
| EP | 0 696 293 | 2/1996 |
| EP | 0 721 640 | 7/1996 |
| EP | 0 699 213 | 2/1998 |
| EP | 0 707 513 | 9/1998 |

(Continued)

OTHER PUBLICATIONS

International Search Report dated Jul. 14, 2014 for International Application No. PCT/EP2014/001068.
Written Opinion of the International Searching Authority dated Jul. 14, 2014 for International Application No. PCT/EP2014/001068.
International Preliminary Report on Patentability dated Oct. 27, 2015 for International Application No. PCT/EP2014/001068.

*Primary Examiner* — Rip A Lee
(74) *Attorney, Agent, or Firm* — Richard M. Klein; Fay Sharpe LLP

(57) ABSTRACT

The present invention relates to a polypropylene composition comprising a multimodal propylene random copolymer with at least one comonomer selected from alpha-olefins with 2 or 4 to 8 carbon atoms, wherein the polypropylene composition has a melt flow rate $MFR_2$ (2.16 kg, 230° C.) of 0.05 to 1.0 g/10 min, determined according to ISO 1133, a polydispersity index (PI) of 2.0 to 7.0, and a Charpy Notched Impact Strength at 0° C. of more than 4.0 kJ/m², determined according to ISO 179/1eA:2000 using notched injection moulded specimens, a process for producing said polypropylene composition, an article comprising said polypropylene composition and the use of said polypropylene composition for the production of an article.

20 Claims, No Drawings

(56) References Cited

U.S. PATENT DOCUMENTS

| | | | |
|---|---|---|---|
| 4,803,251 A | 2/1989 | Goode et al. | |
| 4,855,370 A | 8/1989 | Chirillo et al. | |
| 4,933,149 A | 6/1990 | Rhee et al. | |
| 5,026,795 A | 6/1991 | Hogan | |
| 5,391,654 A | 2/1995 | Ahvenainen et al. | |
| 7,309,741 B2 * | 12/2007 | Kazakov | C08L 23/04 525/240 |
| 9,096,751 B2 * | 8/2015 | Bergstra | C08L 23/10 |
| 2008/0214704 A1 * | 9/2008 | Harjuntausta | C08L 23/10 524/58 |
| 2010/0267871 A1 * | 10/2010 | Tsao | C07F 9/091 524/127 |
| 2011/0245427 A1 * | 10/2011 | Cavalieri | B29C 47/0023 525/240 |
| 2011/0288213 A1 * | 11/2011 | Bergstra | C08F 10/06 524/108 |
| 2011/0293867 A1 * | 12/2011 | Bernreitner | C08F 10/00 428/36.9 |
| 2013/0309431 A1 * | 11/2013 | Bergstra | C08L 23/10 428/36.9 |
| 2015/0299442 A1 * | 10/2015 | Horill | C08L 23/12 524/451 |
| 2016/0024288 A1 * | 1/2016 | Hedesiu | B29C 47/0023 525/216 |
| 2016/0053034 A1 * | 2/2016 | Hedesiu | B29B 9/06 526/159 |
| 2016/0060371 A1 * | 3/2016 | Boragno | C08F 210/06 526/65 |
| 2016/0060441 A1 * | 3/2016 | Hedesiu | C08L 23/14 428/36.9 |
| 2016/0075865 A1 * | 3/2016 | Hedesiu | C08L 23/14 428/36.9 |
| 2016/0145428 A1 * | 5/2016 | Hedesiu | C08L 23/14 428/36.9 |

FOREIGN PATENT DOCUMENTS

| | | | |
|---|---|---|---|
| EP | 0 887 379 | 12/1998 | |
| EP | 0 887 380 | 12/1998 | |
| EP | 0 887 381 | 12/1998 | |
| EP | 0 891 990 | 1/1999 | |
| EP | 0 991 684 | 4/2000 | |
| EP | 1 310 295 | 5/2003 | |
| EP | 1 415 999 | 5/2004 | |
| EP | 1 183 307 | 7/2005 | |
| EP | 1 591 460 | 11/2005 | |
| EP | 1 724 289 | 11/2006 | |
| EP | 1 860 125 | 11/2007 | |
| EP | 2 014 715 | 1/2009 | |
| EP | 2 014 715 A1 * | 1/2009 | C08L 23/10 |
| EP | 2 361 950 | 8/2011 | |
| EP | 2 361 950 A1 * | 8/2011 | C08L 23/10 |
| EP | 2 368 937 | 9/2011 | |
| EP | 2 535 372 | 12/2012 | |
| EP | 107240289 B2 * | 1/2013 | C08F 10/06 |
| GB | 1 580 635 | 12/1980 | |
| WO | WO 87/07620 | 12/1987 | |
| WO | WO 92/19653 | 11/1992 | |
| WO | WO 92/19658 | 11/1992 | |
| WO | WO 92/19659 | 11/1992 | |
| WO | WO 92/21705 | 12/1992 | |
| WO | WO 93/11165 | 6/1993 | |
| WO | WO 93/11166 | 6/1993 | |
| WO | WO 1993/19100 | 9/1993 | |
| WO | WO 94/25495 | 11/1994 | |
| WO | WO 97/36939 | 10/1997 | |
| WO | WO 98/12234 | 3/1998 | |
| WO | WO 98/58975 | 12/1998 | |
| WO | WO 98/58976 | 12/1998 | |
| WO | WO 98/58977 | 12/1998 | |
| WO | WO 99/24479 | 5/1999 | |
| WO | WO 99/33842 | 7/1999 | |
| WO | WO 00/29452 | 5/2000 | |
| WO | WO 00/68315 | 11/2000 | |
| WO | WO 2005/087361 | 9/2005 | |
| WO | WO 2007/025640 | 3/2007 | |
| WO | WO 2011/117103 A1 * | 9/2011 | C08L 23/10 |

* cited by examiner

POLYPROPYLENE COMPOSITION WITH IMPROVED IMPACT RESISTANCE FOR PIPE APPLICATIONS

The present invention relates to propylene random copolymer compositions with an improved balance of properties in regard of mechanical properties including impact properties and processing properties which are suitable for pipe applications.

Polypropylene materials are frequently used for various pipe and pipe fitting applications, such as fluid transport, e.g. water or natural gas, during which the fluid is pressurized and/or heated. In particular, polypropylene materials are used in applications for plumbing and heating, such as in-house hot and cold water pressure pipes and fittings, floor and wall heating systems and radiator connections.

Thereby, propylene random copolymers are especially suitable for pressure pipe applications for hot water and industrial pipes as the random copolymers have inter alia good impact performance, stiffness, creep resistance and slow crack properties and long term pressure resistance.

The expression "pressure pipe" used herein refers to a pipe which, when used, is subjected to a positive pressure, that is the pressure inside the pipe being higher than the pressure outside the pipe.

It is well known that increasing one of the impact or stiffness properties sacrifices the other.

Naturally, processability like extrusion output rate during pipe production and shorter cycle time during injection moulding of fittings should be industrially feasible, as well as the surface quality of the final pipe and/or fitting.

WO0068315 (EP1183307) discloses BNT nucleated homo polymer and heterophasic copolymer of propylene and the use thereof in various application mainly concerned with moulding applications. The high melt flow rates of the compositions do not enable pipe applications.

WO 99/24479 of Borealis discloses nucleated propylene polymer, however examples disclose homo polymers of propylene and heterophasic copolymers of propylene. The heterophasic copolymers of propylene are stated to be "stiff" (examples 9 and 10, e.g. flexural modulus of around 1500 and 1600 MPa), whereby they are suitable for sewage pipe applications.

There is still a need for polypropylene copolymer compositions with an improved balance of impact and mechanical properties and good processing properties which are suitable for pipe and pipe fittings and especially for pressure pipe applications.

The present invention relates to a polypropylene composition suitable for pipe applications comprising
a propylene random copolymer with at least one comonomer
  selected from alpha-olefins with 2 or 4 to 8 carbon atoms
wherein the polypropylene composition has a melt flow rate
  $MFR_2$ (2.16 kg, 230° C.) of 0.05 to 1.0 g/10 min,
  determined according to ISO 1133, a polydispersity index
  (PI) of 2.0 to 7.0, and a Charpy Notched Impact Strength
  at 0° C. of at least 4.0 kJ/m², determined according to ISO
  179/1eA:2000 using notched injection moulded specimens.

The present invention is further characterized in that the multimodal propylene random copolymer of the polypropylene composition of the invention does not contain an elastomeric phase dispersed therein.

It has surprisingly been found that the polypropylene composition according to the present invention has an advantageous property balance between mechanical properties in view of the Flexural Modulus and impact properties, as can be seen from the Charpy Notched Impact Strength at cold temperature 0° C. and preferably also at room temperature. The balance between the Flexural Modulus and the Charpy Notched Impact Strength at cold temperature provides sufficient flexibility and good impact properties to the polypropylene composition of the invention making it highly suitable for pipe applications, more preferably for hot and cold water pressure pipe applications. More preferably the present inventive polypropylene composition shows advantageously feasible creep resistance as can be seen from tensile stress. Further preferably, the present multimodal polypropylene composition has advantageous pressure resistance required for pressure pipe applications. The present multimodal polypropylene composition has preferably also an advantageous processing behavior in terms of pipe extrusion and/or cycle time of molded fittings. The obtained final pipe or fitting has a uniform shrinkage behavior and a good surface quality.

Pressure pipe for hot and cold water applications has a well-known meaning in the field of polypropylene pipe applications and implies for a skilled person generally accepted property requirements for the pipe to be usable in such applications.

A propylene random copolymer denotes a copolymer of propylene monomer units and comonomer units in which the comonomer units are randomly distributed in the polymeric chain. Thereby, a propylene random copolymer includes a fraction, which is insoluble in xylene—xylene cold insoluble (XCU) fraction, in an amount of at least 70 wt %, more preferably of at least 80 wt %, still more preferably of at least 85 wt % and most preferably of at least 90 wt %, based on the total amount of the propylene random copolymer.

The random copolymer does not contain an elastomeric polymer phase dispersed therein.

As known for skilled person, random copolymer is different from heterophasic polypropylene which is a propylene copolymer comprising a propylene homo or random copolymer matrix component (1) and an elastomeric copolymer component (2) of propylene with one or more of ethylene and C4-C8 alpha-olefin copolymers, wherein the elastomeric (amorphous) copolymer component (2) is dispersed in said propylene homo or random copolymer matrix polymer (1).

Usually, a propylene polymer comprising at least two propylene polymer fractions (components), which have been produced under different polymerisation conditions resulting in different (weight average) molecular weights and/or different comonomer contents for the fractions, preferably produced by polymerizing in multiple polymerization stages with different polymerization conditions, is referred to as "multimodal". The prefix "multi" relates to the number of different polymer fractions the propylene polymer is consisting of. As an example of multimodal polypropylene, a propylene polymer consisting of two fractions only is called "bimodal", whereas a propylene polymer consisting of three fractions only is called "trimodal".

Thereby the term "different" means that the propylene polymer fractions differ from each other in at least one property, preferably in the weight average molecular weight or comonomer content or both, more preferably at least in the weight average molecular weight.

The form of the molecular weight distribution curve, i.e. the appearance of the graph of the polymer weight fraction as function of its molecular weight, of such a multimodal propylene polymer is at least distinctly broadened in comparison with the curves for the individual fractions.

The propylene random copolymer used in the present invention is preferably a multimodal propylene random copolymer, more preferably a bimodal propylene random copolymer. Preferably, the propylene random copolymer consists of the two propylene copolymer fractions with the proviso that at least one of the two fractions, preferably both fractions are propylene random copolymer fractions.

A propylene homopolymer thereby denotes a polymer consisting essentially of propylene monomer units. Due to the requirements of large-scale polymerization it may be possible that the propylene homopolymer includes minor amounts of comonomer units, which usually is below 0.1 mol %, preferably below 0.05 mol %, most preferably below 0.01 mol % of the propylene homopolymer.

The propylene random copolymer used in the polypropylene composition of the invention comprises at least one comonomer selected from alpha-olefins with 2 or 4 to 8 carbon atoms.

The propylene random copolymer may comprise only one type of comonomers or two or more types of comonomers. The comonomers of said propylene random copolymer are preferably selected from $C_2$ and $C_4$ to $C_6$ alpha-olefins. A particular preferred comonomer is ethylene.

Especially suitable for the polypropylene composition of the present invention is a propylene random copolymer which is a propylene copolymer with ethylene comonomer.

It is preferred that the propylene random copolymer, which is preferably the propylene copolymer with ethylene comonomer, comprises at least a propylene random copolymer having a low molecular weight (low molecular weight (LMW) fraction) and a propylene random copolymer having a high molecular weight (high molecular weight (HMW) fraction). Thereby, the LMW fraction has a lower weight average molecular weight than the HMW fraction.

It is well known that melt flow rate (MFR) of a polymer is an indication of the weight average molecular weight (Mw) of the polymer, the higher the MFR the lower the Mw of the polymer and, respectively, the lower the MFR the higher the Mw of the polymer. Accordingly, the MFR of the low molecular weight fraction is higher than the MFR of the high molecular weight fraction. The low molecular weight fraction has preferably a $MFR_2$ of from 0.2 to 3.0 g/10 min, more preferably a $MFR_2$ from 0.25 to 2.0 g/10 min, more preferably from 0.3 to 2.0 g/10 min and most preferably of 0.35 to 2.0 g/10 min.

Preferably both the low molecular weight fraction and the high molecular weight fraction are propylene random copolymer fractions which may have essentially the same or different comonomer content. It is preferred that the comonomer content of the high molecular weight fraction is equal to or higher than, preferably higher than the comonomer content of the low molecular weight fraction.

The comonomer content of the low molecular weight fraction is usually in the range of 1.0 to 6.0 mol %, preferably 2.0 to 5.5 mol %, more preferably 3.0 to 5.0 mol %, most preferably 3.5 to 4.5 mol %, based on the total content of monomeric units in the low molecular weight fraction.

The comonomer content of the high molecular weight fraction is usually in the range of 5.5 to 12 mol %, preferably 6.0 to 11.0 mol %, more preferably 6.5 to 10.0 mol %%, still more preferably 7.0 to 9.0 mol %, most preferably 7.5 to 8.5 mol %, based on the total content of monomeric units in the high molecular weight fraction.

In a preferred embodiment of the invention, the propylene random copolymer is a propylene random copolymer with ethylene comonomer comprising at least a propylene random copolymer having a low molecular weight (low molecular weight (LMW) fraction) and a propylene random copolymer having a high molecular weight (high molecular weight (HMW) fraction) and a higher content of comonomer, preferably ethylene comonomer, than the low molecular weight fraction (LMW fraction). In this preferred embodiment the content of the comonomer, preferably ethylene comonomer in the LMW fraction, is within the preferred ranges as defined above.

The comonomer content of the propylene random copolymer is usually in the range of 4.5 to 9.5 mol %, preferably 5.0 to 9.0 mol %, more preferably 5.5 to 8.0 mol %, still more preferably 5.5 to 7.5 mol %, most preferably 5.7 to 7.0 mol %, based on the total content of monomeric units in the propylene random copolymer.

The low molecular weight fraction and the high molecular weight fraction may include the same type of comonomer or different types of comonomers. It is preferred that both fractions include the same type of comonomer.

The low molecular weight fraction is preferably present in the propylene random copolymer in an amount of 30 to 50 wt %, more preferably in an amount of 35 to 47 wt % and most preferably in an amount of 37 to 47 wt %, based on the total amount of the propylene random copolymer (100 wt %), preferably, and the high molecular weight fraction is preferably present in the propylene random copolymer in an amount of 70 to 50 wt %, more preferably in an amount of 65 to 53 wt % and most preferably in an amount of 63 to 53 wt %, based on the total amount of the propylene random copolymer (100 wt %).

The propylene random copolymer preferably has a density of 890 to 910 kg/m$^3$, preferably 895 to 905 kg/m$^3$.

It is preferred that the propylene random copolymer consists of the propylene random copolymer having a low molecular weight (low molecular weight (LMW) fraction), the propylene random copolymer having a high molecular weight (high molecular weight (HMW) fraction), and optional further additives, as defined above or below.

The multimodal propylene random copolymer may further comprise a prepolymer fraction. In case of the presence of a prepolymer fraction, said fraction is calculated to the amount (wt %) of the low molecular weight fraction or high molecular weight fraction, preferably to the amount of low molecular weight fraction. The prepolymer fraction can be propylene homopolymer or copolymer.

It is especially preferred that polypropylene composition according to the invention consists of the propylene random copolymer and optional further additives, as defined above or below.

The amount of the propylene random copolymer is preferably 90.0 to 99.75 wt %, more preferably of 95.0 to 99.75 wt % and even more preferably of 96.5 to 99.75 wt %, based on the total weight of the polypropylene composition (100 wt %).

The polypropylene composition may in addition to the propylene random copolymer as described above further comprise other polymeric components. These polymeric components preferably are polyolefins, more preferably are propylene homo- or copolymers. These additional polymers can be present in the composition in an amount of up to 15 wt % of the total weight of the polypropylene composition (100 wt %).

However, it is preferred that the polymeric component of the polypropylene composition consists of the propylene random copolymer as defined above.

Moreover, the polypropylene composition of the invention may contain additives including without limiting to, clarifiers, brighteners, acid scavengers and antioxidants, as well as slip agents, inorganic filler and UV light stabilizers. Each additive can be used e.g. in conventional amounts, the total amount of additives present in the polypropylene composition being preferably as defined below. Such additives are generally commercially available and are described, for example, in "Plastic Additives Handbook", 5th edition, 2001 of Hans Zweifel.

It is preferred that the polypropylene composition does not comprise a polymeric nucleating agent that is added on purpose to function as a nucleating agent. More preferably, the polypropylene composition does not comprise (i.e. is void of) a polymeric nucleating agent, selected from a polymerized vinyl compound according to the following formula

$$CH_2=CH—CHR^1R^2 \qquad (I)$$

wherein $R^1$ and $R^2$ together form a 5- or 6-membered saturated, unsaturated or aromatic ring, optionally containing substituents, or independently represent an alkyl group comprising 1 to 4 carbon atoms, whereby in case $R^1$ and $R^2$ form an aromatic ring, the hydrogen atom of the —$CHR^1R^2$ moiety is not present, for example vinyl cyclohexane (VCH) polymer.

The total amount of optional further additives is preferably between 0.0001 and 2.5 wt %, more preferably between 0.0001 and 1.5 wt %, still more preferably between 0.0001 and 1.0 wt %, based on the total weight of the polypropylene composition (100 wt %). In case the optional additive(s) is added in an optional masterbatch, then the carrier material, e.g. carrier polymer, of the additive is calculated to the (total) amount of the additive(s), based on the total weight of the polypropylene composition (100 wt %).

The polypropylene composition preferably has a melt flow rate $MFR_2$ (2.16 kg, 230° C.) of from 0.1 to 1.0 g/10 min, preferably of from 0.1 to 0.7 g/10 min, more preferably of from 0.15 to 0.5 g/10 min, most preferably of from 0.2 to 0.4 g/10 min, determined according to ISO 1133.

The polypropylene composition additionally has a polydispersity index PI of from 2.0 to 7.0, preferably from 2.0 to 6.0, preferably of from 2.5 to 5.0, more preferably of from 2.7 to 4.5 and most preferably of from 2.7 to 4.0. The polydispersity index is determined from rheological measurements as described below in the example section.

Further, the polypropylene composition preferably has a content of xylene cold solubles (XCS) of from 1.0 to 15.0 wt %, preferably of from 2.0 to 12.0 wt %, more preferably of from 4.0 to 10.0 wt %, determined at 25° C. according to ISO 16152.

The polypropylene composition preferably has a Charpy Notched Impact Strength at 0° C. of at least 5.0 kJ/m², more preferably of at least 6.0 kJ/m², still more preferably of at least 6.5 kJ/m², determined according to ISO 179/1eA:2000 using notched injection moulded specimens. The upper limit of the Charpy Notched Impact Strength at 0° C. is preferably not higher than 15 kJ/m².

Also preferably, the polypropylene composition has a Charpy Notched Impact Strength at 23° C. of at least 30 kJ/m², preferably of at least 40 kJ/m², more preferably of at least 45 kJ/m², determined according to ISO 179/1eA:2000 using notched injection moulded specimens. The upper limit of the Charpy Notched Impact Strength at 23° C. is preferably not higher than 100 kJ/m².

The polypropylene composition preferably has a flexural modulus at least 700 MPa, preferably at least 750 MPa, most preferably at least 780 MPa, determined according to ISO 178 at a test speed of 2 mm/min and a force of 100N on test specimens having a dimension of 80×10×4.0 mm³ (length× width×thickness) prepared by injection moulding according to EN ISO 1873-2. The upper limit of the flexural modulus usually does not exceed 1400 MPa, and is preferably 1200 MPa or less. The polypropylene composition most preferably has a flexural modulus of 780 to 1100 MPa.

Further, the polypropylene composition preferably has a tensile stress at yield of at least 15 MPa, more preferably at least 20 MPa, most preferably at least 23 MPa, determined according to ISO 527-2:1996 using type 1A injection moulded test specimens prepared according to ISO 527-2: 1996. The upper limit of the tensile stress at yield usually does not exceed 50 MPa and is preferably not higher than 45 MPa.

The shrinkage of the polypropylene composition after forming the composition into an article, preferably a pipe or a pipe fitting, is preferably not more than 6%, more preferably not more than 5%, most preferably not more than 4%.

The polypropylene composition of the invention is preferably produced in a continuous multistage process in a conventional manner. It is to be understood that as soon as the inventors have found the advantageous property balance resulting to the polypropylene composition, then for industrial scale production it is within the skills of a skilled person to adjust process parameters and controls to obtain the properties of the polypropylene composition. The process preferably comprises at least two polymerisation stages.

Accordingly a process for producing a polypropylene composition as described above or below, wherein the propylene random copolymer is polymerized in a multistage polymerization process in the presence of (I) a solid catalyst component comprising a magnesium halide, a titanium halide and an internal electron donor; and (II) a cocatalyst comprising an aluminium alkyl and optionally an external electron donor, the multistage process comprising the steps of (a) continuously polymerizing propylene together with a comonomer selected from alpha-olefins with 2 or 4 to 8 carbon atoms, in a first polymerization stage by introducing streams of propylene, hydrogen and said comonomer into the first polymerization stage at a temperature of 60 to 80° C. and a pressure of 3000 to 6500 kPa to produce a first propylene random copolymer, wherein said first propylene random copolymer has a melt flow rate $MFR_2$ (2.16 kg; 230° C.; ISO 1133) of from 0.2 to 3.0 g/min;

(b) withdrawing from the first polymerization stage a stream comprising said first propylene random copolymer and transferring said stream into a second polymerization stage;

(c) polymerizing propylene together with a comonomer selected from alpha-olefins with 2 or 4 to 8 carbon atoms, in said second polymerization stage by introducing streams of propylene, said comonomer and optionally hydrogen into said second polymerization stage at a temperature of 70 to 90° C. and a pressure of 1000 to 3000 kPa to produce a propylene random copolymer of said first propylene random copolymer and a second propylene random copolymer;

(d) continuously withdrawing a stream comprising said propylene random copolymer from the second polymerization stage and optionally mixing said propylene random copolymer with additives; and (e) extruding said propylene random copolymer mixture into pellets, which have a melt flow rate $MFR_2$ (2.16 kg; 230° C.; ISO 1133) of from 0.05 to 1.0 g/min, and wherein the first propylene random copolymer has preferably a a higher $MFR_2$ than the second propylene random copolymer.

The process of the invention is described in further details below:

Thereby, conventional polymerization techniques, e.g. gas phase, solution phase, slurry or bulk polymerization can be used.

In general, a combination of slurry (or bulk) and at least one gas phase reactor is often preferred for the polymerisation of the propylene random copolymer. It is further preferred that the reactor order is slurry (or bulk) then one or more gas phase reactors.

In case of propylene polymerisation for slurry reactors, the reaction temperature will generally be in the range 60 to 110° C., e.g. 60 to 85° C., the reactor pressure will generally be in the range 5 to 80 bar, e.g. 20 to 60 bar, and the residence time will generally be in the range 0.1 to 5 hours, e.g. 0.3 to 2 hours. The monomer is usually used as reaction medium.

For gas phase reactors, the reaction temperature used will generally be in the range 60 to 115° C., e.g. 70 to 110° C., the reactor pressure will generally be in the range 10 to 25 bar, and the residence time will generally be 0.5 to 8 hours, e.g. 0.5 to 4 hours. The gas used will be the monomer optionally as mixture with a non-reactive gas such as nitrogen or propane.

In addition to actual polymerisation steps and reactors, the process can contain any additional polymerisation steps, like prepolymerisation step, and any further after reactor handling steps as known in the art.

It is preferred that the propylene random copolymer is produced in a sequential polymerization process comprising at least two polymerization zones operating at different conditions to produce the propylene random copolymer. The polymerization zones may operate in slurry, solution, or gas phase conditions or their combinations. Suitable processes are disclosed, among others, in WO-A-98/58975, WO-A-98/58976, EP-A-887380 and WO-A-98/58977.

In a preferred embodiment, the prepolymerization is conducted in a continuous manner as bulk slurry polymerization in liquid propylene, i.e. the liquid phase mainly comprises propylene, with minor amount of other reactants and optionally inert components dissolved therein. Preferably the prepolymerization is conducted in a continuous stirred tank reactor or a loop reactor, preferably in a loop reactor.

The prepolymerization reaction is typically conducted at a temperature of 0 to 60° C., preferably from 10 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The reaction conditions are well known in the art as disclosed, among others, in GB 1580635.

In the prepolymerization step it is also possible to feed comonomers into the prepolymerization stage. Examples of suitable comonomers are ethylene or alpha-olefins having from 4 to 8 carbon atoms. Especially suitable comonomers are ethylene, 1-butene, 1-hexene, 1-octene or their mixtures. Especially preferred is ethylene as comonomer.

In a preferred embodiment for polymerizing the propylene random copolymer the first propylene random copolymer is preferably produced in a first polymerization stage.

Said first propylene random copolymer most preferably reflects the low molecular weight (LMW) fraction of the propylene random copolymer as defined above.

The first propylene random copolymer is produced by introducing a polymerization catalyst, optionally through the prepolymerization stage as disclosed above, into the first polymerization stage together with a first monomer mixture containing propylene and a comonomer selected from ethylene and alpha-olefins containing 4 to 8 carbon atoms. The content of the comonomers is controlled to obtain a desired comonomer content in the first propylene random copolymer. The comonomer content of said first propylene random copolymer preferably reflects the comonomer content of the low molecular weight (LMW) fraction of the propylene random copolymer as defined above.

The first propylene random copolymer produced in the first polymerization stage has a $MFR_2$ of from 0.2 to 3.0 g/10 min. Preferably the $MFR_2$ of the first propylene random copolymer, preferably of the low molecular weight (LMW) fraction of the propylene random copolymer, is from 0.25 to 2.0 g/10 min, more preferably from 0.3 to 2.0 g/10 min and most preferably of 0.35 to 2.0 g/10 min.

The polymerization in the first polymerization zone is preferably conducted in slurry in a loop reactor. For this reason the terms "first polymerization stage" and "loop reactor" may be used interchangeably within the context of the present invention. Then the polymer particles formed in the polymerization, together with the catalyst fragmented and dispersed within the particles, are suspended in the fluid hydrocarbon. The slurry is agitated to enable the transfer of reactants from the fluid into the particles. In loop reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654.

Slurry polymerization is preferably a so called bulk polymerization. By "bulk polymerization" is meant a process where the polymerization is conducted in a liquid monomer essentially in the absence of an inert diluent. However, as it is known to a person skilled in the art the monomers used in commercial production are never pure but always contain aliphatic hydrocarbons as impurities. For instance, the propylene monomer may contain up to 5% of propane as an impurity. As propylene is consumed in the reaction and also recycled from the reaction effluent back to the polymerization, the inert components tend to accumulate, and thus the reaction medium may comprise up to 40 wt-% of other compounds than monomer. It is to be understood, however, that such a polymerization process is still within the meaning of "bulk polymerization", as defined above.

The temperature in the slurry polymerization is typically from 50 to 110° C., preferably from 60 to 80° C. and more preferably from 65 to 75° C. The pressure is from 1 to 150 bar, preferably from 10 to 100 bar and most preferably from 30 to 65 bar.

The slurry may be withdrawn from the reactor either continuously or intermittently. A preferred way of intermittent withdrawal is the use of settling legs where the solids concentration of the slurry is allowed to increase before withdrawing a batch of the concentrated slurry from the reactor. The use of settling legs is disclosed, among others, in U.S. Pat. Nos. 3,374,211, 3,242,150 and EP-A-1310295. Continuous withdrawal is disclosed, among others, in EP-A-891990, EP-A-1415999, EP-A-1591460 and EP-A-

1860125. The continuous withdrawal may be combined with a suitable concentration method, as disclosed in EP-A-1860125 and EP-A-1591460.

Into the slurry polymerization stage other components are also introduced as it is known in the art. Thus, hydrogen is used to control the molecular weight of the polymer. Process additives, such as antistatic agent, may be introduced into the reactor to facilitate a stable operation of the process.

Preferably, the ratio of comonomer to propylene in the first polymerization stage is in the range of 0.2 to 20 mol/kmol, more preferably in the range of 0.5 to 15 mol/kmol, still more preferably in the range of 0.5 to 10 mol/kmol and most preferably in the range of 1 to 10 mol/kmol.

Preferably, the ratio of hydrogen to propylene in the first polymerization stage is in the range of 0.1 to 5.0 mol/kmol, more preferably in the range of 0.1 to 2.5 mol/kmol, still more preferably in the range of 0.2 to 1.5 mol/kmol and most preferably in the range of 0.3 to 1.0 mol/kmol.

The slurry is preferably conducted directly into a second polymerization stage, which preferably is a gas phase polymerization stage, to produce the second propylene random copolymer. By "directly" it is meant that the slurry is introduced from the loop reactor into the gas phase reactor without a flash step between the slurry and gas phase polymerization stages for removing at least a part of the reaction mixture from the polymer. Thereby, substantially the entire slurry stream withdrawn from the first polymerization stage is directed to the second polymerization stage. This kind of direct feed is described in EP-A-887379, EP-A-887380, EP-A-887381 and EP-A-991684. It is preferred that the whole slurry stream withdrawn from the loop reactor is directed into the gas phase reactor without any separation step in between. However, it is within the scope of the present invention to take small samples or sample streams from the polymer or from the fluid phase or from both for analyzing the polymer and/or the composition of the reaction mixture. As understood by the person skilled in the art, the volume of such sample streams is small compared to the total slurry stream withdrawn from the loop reactor and typically much lower than 1% by weight of the total stream, such as at most 0.1% or 0.01% or even 0.001% by weight.

When the entire slurry stream from the first polymerization stage is introduced into the second polymerization stage then substantial amounts of propylene, comonomer and hydrogen are introduced into the second polymerization stage together with the polymer.

As discussed above, a certain amount of propylene and comonomer is introduced into the second polymerization stage from the first polymerization stage. However, this is generally not sufficient to maintain desired propylene and comonomer concentrations in the second polymerization stage. Therefore additional propylene and comonomer are typically introduced into the second polymerization stage. They are introduced to maintain a desired propylene concentration and to reach a desired ratio of comonomer to propylene in the fluidization gas. Even though the actual comonomer to monomer ratio that is needed to reach the desired content of comonomer in the polymer depends on the catalyst used in the process, the composition of the monomer and comonomer feeds is suitably adjusted so that the fluidization gas has a ratio of comonomer to propylene of about 10 to 100 mol/kmol, preferably from 15 to 70 mol/kmol. Such ratios have been found to yield good results for some catalysts.

It is also often necessary to introduce additional hydrogen into the second polymerization stage to control the MFR of the copolymer mixture. Suitably, the hydrogen feed is controlled to maintain constant hydrogen to propylene ratio in the fluidization gas. The actual ratio depends on the catalyst. Good results have been obtained by maintaining the ratio within the range of from 0.1 to 3 mol/kmol, preferably from 0.2 to 2 mol/kmol.

In a fluidized bed gas phase reactor olefins are polymerized in the presence of a polymerization catalyst in an upwards moving gas stream. The reactor typically contains a fluidized bed comprising the growing polymer particles containing the active catalyst, said fluidized bed having its base above a fluidization grid.

The polymer bed is fluidized with the help of the fluidization gas comprising the olefin monomer, eventual comonomer(s), eventual chain growth controllers or chain transfer agents, such as hydrogen, and eventual inert gas. The fluidization gas is introduced into an inlet chamber at the bottom of the reactor. To make sure that the gas flow is uniformly distributed over the cross-sectional surface area of the inlet chamber the inlet pipe may be equipped with a flow dividing element as known in the art, e.g. U.S. Pat. No. 4,933,149 and EP-A-684871. One or more of the above-mentioned components may be continuously added into the fluidization gas to compensate for losses caused, among other, by reaction or product withdrawal.

From the inlet chamber the gas flow is passed upwards through a fluidization grid into the fluidized bed. The purpose of the fluidization grid is to divide the gas flow evenly through the cross-sectional area of the bed. Sometimes the fluidization grid may be arranged to establish a gas stream to sweep along the reactor walls, as disclosed in WO-A-2005/087361. Other types of fluidization grids are disclosed, among others, in U.S. Pat. No. 4,578,879, EP 600414 and EP-A-721798. An overview is given in Geldart and Bayens: The Design of Distributors for Gas-fluidized Beds, Powder Technology, Vol. 42, 1985.

The fluidization gas passes through the fluidized bed. The superficial velocity of the fluidization gas must be higher that minimum fluidization velocity of the particles contained in the fluidized bed, as otherwise no fluidization would occur. On the other hand, the velocity of the gas should be lower than the terminal velocity, as otherwise the whole bed would be entrained with the fluidization gas. The minimum fluidization velocity and the terminal velocity can be calculated when the particle characteristics are known by using common engineering practise. An overview is given, among others in Geldart: Gas Fluidization Technology, J. Wiley & Sons, 1986.

When the fluidization gas is contacted with the bed containing the active catalyst the reactive components of the gas, such as monomers and chain transfer agents, react in the presence of the catalyst to produce the polymer product. At the same time the gas is heated by the reaction heat.

The unreacted fluidization gas is removed from the top of the reactor and cooled in a heat exchanger to remove the heat of reaction. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerizable components, such as n-pentane, isopentane, n-butane or isobutane, which are at least partially condensed in the cooler.

The gas is then compressed and recycled into the inlet chamber of the reactor. Prior to the entry into the reactor fresh reactants are introduced into the fluidization gas stream to compensate for the losses caused by the reaction and product withdrawal. It is generally known to analyze the composition of the fluidization gas and introduce the gas components to keep the composition constant. The actual composition is determined by the desired properties of the product and the catalyst used in the polymerization.

The polymeric product may be withdrawn from the gas phase reactor either continuously or intermittently. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

The top part of the gas phase reactor may include a so called disengagement zone. In such a zone the diameter of the reactor is increased to reduce the gas velocity and allow the particles that are carried from the bed with the fluidization gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain a time-averaged bed level.

Also antistatic agent(s) may be introduced into the gas phase reactor if needed. Suitable antistatic agents and methods to use them are disclosed, among others, in U.S. Pat. Nos. 5,026,795, 4,803,251, 4,532,311, 4,855,370 and EP-A-560035. They are usually polar compounds and include, among others, water, ketones, aldehydes and alcohols.

The reactor may also include a mechanical agitator to further facilitate mixing within the fluidized bed. An example of suitable agitator design is given in EP-A-707513.

Typically the fluidized bed polymerization reactor is operated at a temperature within the range of from 50 to 100° C., preferably from 70 to 90° C. The pressure is suitably from 10 to 40 bar, preferably from 10 to 30 bar.

In the second polymerization stage preferably a copolymer mixture comprising the first propylene random copolymer and a second copolymer is formed.

Said first propylene random copolymer preferably reflects the propylene random copolymer having a low molecular weight (LMW) fraction of the propylene random copolymer and said second propylene random copolymer preferably reflects the high molecular weight (HMW) fraction of the propylene random copolymer as defined above. Thus, copolymer mixture comprising the first propylene random copolymer and a second propylene random copolymer preferably reflects a mixture of the low molecular weight (LMW) fraction and the high molecular weight (HMW) fraction of the propylene random copolymer as defined above. The amount of any prepolymer fraction thereby preferably adds to the amount of the low molecular weight fraction.

The copolymer mixture is formed by introducing the particles of the first propylene random copolymer, containing active catalyst dispersed therein, together with additional propylene and comonomer into the second polymerization stage. This causes the second copolymer to form on the particles containing the first propylene random copolymer. The second polymerization stage is preferably conducted in a fluidized bed gas phase reactor. For this reason the terms "second polymerization stage" and "gas phase reactor" may be used interchangeably within the context of the present invention.

The comonomer is selected from ethylene and alpha-olefins containing 4 to 8 carbon atoms. The comonomer used in the second polymerization stage may be the same as or different from the comonomer used in the first polymerization stage. Preferably the same comonomer is used in the first and the second polymerization stages.

Also in the second polymerization stage the content of the comonomers is controlled to obtain the desired comonomer content of the copolymer mixture. The obtained reaction mixture is the polymer of propylene random copolymer.

Typically the obtained propylene random copolymer contains from 4.5 to 9.5 mol % units derived from the comonomer.

Furthermore, the comonomer content of the obtained propylene random copolymer is equal to or higher than the comonomer content of the first propylene random copolymer. Preferably the ratio of the comonomer content of the first propylene random copolymer to the comonomer content of the obtained propylene random copolymer (both expressed in mol %), $C_1/C_b$, is not higher than 0.9, more preferably not higher than 0.8, especially preferably not higher than 0.7.

The $MFR_2$ of the obtained propylene random copolymer is from 0.05 to 1.0 g/10 min. Preferably the $MFR_2$ of the obtained propylene random copolymer is from 0.1 to 0.7 g/10 min. Furthermore, the MFR of the obtained propylene random copolymer is lower than the MFR of the first propylene random copolymer. Preferably, the ratio of the MFR of the obtained propylene random copolymer to MFR of the first propylene random copolymer, $MFR_{2,b}/MFR_{2,1}$, has a value of not higher than 0.8, more preferably not higher than 0.6 and in particular not higher than 0.5.

According to a preferred embodiment of the invention the ratio $C_1/C_b$ is not higher than 0.9 and the ratio $MFR_{2,b}/MFR_{2,1}$ is not higher than 0.8; more preferably the ratio $C_1/C_b$ is not higher than 0.7 and the ratio $MFR_{2,b}/MFR_{2,1}$ is not higher than 0.5.

The obtained propylene random copolymer preferably comprises the ratio of the first propylene random copolymer to second random copolymer as defined above or in claims.

As to catalyst, the propylene random copolymer can be produced by polymerisation in the presence of any conventional coordination catalyst including Ziegler-Natta, chromium and single site (like metallocene catalyst), preferably in the presence of a Ziegler-Natta catalyst. Such Ziegler-Natta catalysts typically comprise a solid transition metal component and a cocatalyst.

The solid Ziegler Natta catalyst component preferably comprises a transition metal component which preferably is a titanium halide and a magnesium halide. These compounds may be supported on a particulate support, such as inorganic oxide, like silica or alumina, or, usually, the magnesium halide to form above said solid support. Examples of such solid catalyst components are disclosed, among others, in WO 87/07620, WO 92/21705, WO 93/11165, WO 93/11166, WO 93/19100, WO 97/36939, WO 98/12234, WO 99/33842.

As is well known, the solid catalyst components for polymerising the propylene random copolymer typically comprise, in addition to the magnesium halide and transition metal compound, an electron donor (internal electron donor).

Suitable electron donors are, among others, esters of carboxylic acids, like phthalates, citraconates, and succinates. Also oxygen- or nitrogen-containing silicon compounds may be used. Examples of suitable compounds are shown in WO 92/19659, WO 92/19653, WO 92/19658, U.S. Pat. Nos. 4,347,160, 4,382,019, 4,435,550, 4,465,782, 4,473,660, 4,530,912 and 4,560,671.

Moreover, said solid catalyst components are preferably used in combination with well known external electron donors, including without limiting to, ethers, ketones, amines, alcohols, phenols, phosphines and silanes, for example organosilane compounds containing Si—OCOR, Si—OR, or Si—NR$_2$ bonds, having silicon as the central atom, and R is an alkyl, alkenyl, aryl, arylalkyl or cycloalkyl with 1-20 carbon atoms; and well known cocatalysts, which preferably comprise an aluminium alkyl compound as known in the art to polymerise the propylene random copolymer.

Extrusion:

When the polymer has been removed from the last polymerisation stage, it is preferably subjected to process steps for removing the residual hydrocarbons from the polymer. Such processes are well known in the art and can include pressure reduction steps, purging steps, stripping steps, extraction steps and so on. Also combinations of different steps are possible. After the removal of residual hydrocarbons the second propylene copolymer composition is preferably mixed with additives as it is well known in the art. Such additives include antioxidants, process stabilizers, neutralisers, lubricating agents, pigments and so on. The polymer particles are then extruded to pellets as it is known in the art. Preferably co-rotating twin screw extruder is used for the extrusion step. Such extruders are manufactured, for instance, by Coperion (Werner & Pfleiderer) and Japan Steel Works.

Article of the Invention:

Further, the present invention relates to an article comprising the multimodal polypropylene composition according to the present invention.

In a preferred embodiment, the article is selected from an extruded article, preferably a pipe application, or a moulded article, preferably an injection moulded or blow moulded article, application more preferably a fitting for pipe applications, comprising the multimodal polypropylene composition of the invention. The pipe and fitting produced from the polypropylene composition according to the invention preferably has good mechanical properties as described above and shown below in experimental part. Thus, the pipe according to the invention preferably qualifies as pressure pipe.

Pipe of the invention can be a monolayer pipe, wherein the pipe layer comprises, preferably consists of, the multimodal polypropylene composition of the invention, or a multilayer pipe, wherein at least one layer comprises, preferably consists of, the multimodal polypropylene composition of the invention.

The preferred pipe of the invention has at least one layer comprising, preferably consisting of, the multimodal polypropylene composition of the invention. Preferred pipe is a pressure pipe, more preferably a pressure pipe for hot and cold water applications.

Fitting of the invention preferably consists of the multimodal polypropylene composition of the invention.

Production of Pipe of the Invention:

Pipes can be produced from the multimodal polypropylene composition according to the present invention according to the methods known in the art. Thus, according to one preferred method the multimodal polypropylene composition is extruded through an annular die to a desired internal diameter, after which the multimodal polypropylene composition is cooled.

The pipe extruder preferably operates at a relatively low temperature and therefore excessive heat build-up should be avoided. Extruders having a high length to diameter ratio L/D more than 15, preferably of at least 20 and in particular of at least 25 are preferred. The modern extruders typically have an L/D ratio of from about 30 to 35.

The polymer melt is extruded through an annular die, which may be arranged either as end-fed or side-fed configuration. The side-fed dies are often mounted with their axis parallel to that of the extruder, requiring a right-angle turn in the connection to the extruder. The advantage of side-fed dies is that the mandrel can be extended through the die and this allows, for instance, easy access for cooling water piping to the mandrel.

After the plastic melt leaves the die it is calibrated to the correct diameter. In one method the extrudate is directed into a metal tube (calibration sleeve). The inside of the extrudate is pressurised so that the plastic is pressed against the wall of the tube.

According to another method the extrudate leaving the die is directed into a tube having a perforated section in the centre. A slight vacuum is drawn through the perforation to hold the pipe against the walls of the sizing chamber.

After the sizing the pipe is cooled, typically in a water bath having a length of about 5 meters or more.

Production of Fittings of the Invention:

Fittings of the invention can be produced from the multimodal polypropylene composition according to the present invention using the methods and equipment known in the art. Thus, according to one preferred method the multimodal polypropylene composition is moulded, preferably injection moulded or blown moulded, more preferably injection moulded, in a conventional manner using conventional moulding equipment, to a shape of a fitting for a pipe.

EXAMPLES

1. Determination Methods a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR$_2$ of polypropylene at a temperature 230° C. and a load of 2.16 kg.

The MFR$_2$ is herein assumed to follow the following mixing rule (equation 1):

$$MI_b = (w_1 MI_1^{-0.0965} + w_2 \cdot MI_2^{-0.0965})^{(-1/0.0965)} \qquad (\text{eq. 1})$$

Where w is the weight fraction of the component in the mixture, MI is the MFR$_2$ and subscripts b, 1 and 2 refer to the mixture, component 1 and component 2, respectively.

b) Density

Density of the polymer was measured according to ISO 1183-1:2004 Method A on compression moulded specimen prepared according to EN ISO 1872-2(February 2007) and is given in kg/m$^3$.

c) Comonomer Content

The comonomer content was determined by quantitative Fourier transform infrared spectroscopy (FTIR) after basic assignment calibrated via quantitative $^{13}$C nuclear magnetic resonance (NMR) spectroscopy in a manner well known in the art. Thin films are pressed to a thickness of between 100-500 micrmeter and spectra recorded in transmission mode.

Specifically, the ethylene content of a polypropylene-co-ethylene copolymer is determined using the baseline corrected peak area of the quantitative bands found at 720-722 and 730-733 cm$^{-1}$. Specifically, the butene or hexene content of a polypropylene copolymer is determined using the baseline corrected peak area of the quantitative bands found at 1377-1379 cm$^{-1}$. Quantitative results are obtained based upon reference to the film thickness.

The comonomer content is herein assumed to follow the mixing rule (equation 2):

$$C_b = w_1 \cdot C_1 + w_2 \cdot C_2 \quad \text{(eq. 2)}$$

Where C is the content of comonomer in weight-%, w is the weight fraction of the component in the mixture and subscripts b, 1 and 2 refer to the overall mixture, component 1 and component 2, respectively.

As it is well known to the person skilled in the art the comonomer content in weight basis in a binary copolymer can be converted to the comonomer content in mole basis by using the following equation $$c_m = \frac{1}{1 + \left(\frac{1}{c_w} - 1\right) \cdot \frac{MW_c}{MW_m}} \quad \text{(eq. 3)}$$

where $c_m$ is the mole fraction of comonomer units in the copolymer, $c_w$ is the weight fraction of comonomer units in the copolymer, $MW_c$ is the molecular weight of the comonomer (such as ethylene) and $MW_m$ is the molecular weight of the main monomer (i.e., propylene).

d) Xylene Cold Solubles

Xylene cold solubles (XCS, wt.-%) content was determined at 25° C. according ISO 16152; first edition; 2005-07-01.

The content of xylene soluble polymer is herein assumed to follow the mixing rule (equation 4):

$$XS_b = w_1 \cdot XS_1 + w_2 \cdot XS_2 \quad \text{(eq. 4)}$$

Where XS is the content of xylene soluble polymer in weight-%, w is the weight fraction of the component in the mixture and subscripts b, 1 and 2 refer to the overall mixture, component 1 and component 2, respectively.

e) Flexural Modulus

The flexural modulus was determined according to ISO 178. The test specimens having a dimension of 80×10×4.0 mm$^3$ (length×width×thickness) were prepared by injection molding according to EN ISO 1873-2. The length of the span between the supports was 64 mm, the test speed was 2 mm/min and the force was 100 N.

f) Tensile Stress at Yield, Tensile Strain at Yield

Tensile stress at yield and tensile strain at yield was determined according to ISO 527-1:1996 and ISO 527-2:1996 on test specimen ISO 527-2:1996 type 1A molded specimen, the Injection moulding carried out according to ISO 1873-2:2007.

g) Charpy Notched Impact Strength

Charpy notched impact strength (Charpy NIS) was determined according to ISO 179-1:2000 on notched specimen of 80×10×4 mm, cut from test specimen ISO 527-2:1996 type 1A. Notched impact specimen according to ISO 179-1/1eA:2000 was used. Testing temperature is 23±2° C. for Charpy NIS at 23° C. and 0±2° C. for Charpy NIS at 0° C. Injection moulding carried out according to ISO 1873-2:2007.

h) Rheological Parameters, Polydispersity Index

The characterization of polymer melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates, using nitrogen atmosphere and setting a strain within the linear viscoelastic regime. The oscillatory shear tests were done at T 190° C. applying a frequency range between 0.01 and 600 rad/s and setting a gap of 1.3 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t) = \gamma_0 \sin(\omega t) \quad (1)$$

If the applied strain is within the linear viscoelastic regime, the resulting sinusoidal stress response can be given by $$\sigma(t) = \sigma_0 \sin(\omega t + \delta) \quad (2)$$

where $\sigma_0$ and $\gamma_0$ are the stress and strain amplitudes, respectively $\omega$ is the angular frequency $\delta$ is the phase shift (loss angle between applied strain and stress response)

t is the time

Dynamic test results are typically expressed by means of several different rheological functions, namely the shear storage modulus G', the shear loss modulus, G", the complex shear modulus, G*, the complex shear viscosity, η*, the dynamic shear viscosity, η', the out-of-phase component of the complex shear viscosity η" and the loss tangent, tan δ which can be expressed as follows:

$$G' = \frac{\sigma_0}{\gamma_0} \cos\delta \, [\text{Pa}] \quad (3)$$

$$G'' = \frac{\sigma_0}{\gamma_0} \sin\delta \, [\text{Pa}] \quad (4)$$

$$G^* = G' + iG'' \, [\text{Pa}] \quad (5)$$

$$\eta^* = \eta' - i\eta'' \, [\text{Pa.s}] \quad (6)$$

$$\eta' = \frac{G''}{\omega} \, [\text{Pa.s}] \quad (7)$$

$$\eta'' = \frac{G'}{\omega} \, [\text{Pa.s}] \quad (8)$$

The values of storage modulus (G'), loss modulus (G"), complex modulus (G*) and complex viscosity (η*) were obtained as a function of frequency (ω). Thereby, e.g. $\eta^*_{0.05 \, rad/s}$ (eta*$_{0.05 \, rad/s}$) is used as abbreviation for the complex viscosity at the frequency of 0.05 rad/s.

The polydispersity index, PI, is defined by equation 9.

$$PI = \frac{10^5}{G'(\omega_{COP})}, \, \omega_{COP} = \omega \text{ for } (G' = G'') \quad (9)$$

where, $\omega_{COP}$ is the cross-over angular frequency, determined as the angular frequency for which the storage modulus, G' equals the loss modulus, G".

REFERENCES

[1] Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol., 11th (1992), 1, 360-362
[2] The influence of molecular structure on some rheological properties of polyethylene", Heino, E. L., Borealis Polymers Oy, Porvoo, Finland, Annual Transactions of the Nordic Rheology Society, 1995.).
[3] Definition of terms relating to the non-ultimate mechanical properties of polymers, Pure & Appl. Chem., Vol. 70, No. 3, pp. 701-754, 1998.

2. Examples a) Preparation of the Catalyst

First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of diethylhexylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP 491 566, EP 591 224 and EP 586 390.

For the preparation of Examples Ex1, Ex2, Ex3 and Ex4 as well as Reference Example Ref5 triethylaluminium (TEAL), dicyclopentyldimethoxysilane (DCPDMS) as donor (Do), and the catalyst as produced above were added into oil, like mineral oil, e.g. Technol 68 (kinematic viscosity at 40° C. 62-74 cSt), in amounts so that Al/Ti was 3-4 mol/mol, and Al/Do was as well 3-4 mol/mol. Catalyst concentration in the final oil-catalyst slurry was 10-20 wt-%.

b) Polymerization of Examples Ex1-Ex4 and Reference Example Ref5

For the polymerization of Examples Ex1-Ex4 and Reference Example Ref5 the catalyst was fed together with propylene to a prepolymerization reactor. Triethylaluminium was used as a cocatalyst and dicyclopentyldimethoxysilane as a donor. The polymerization conditions and feeds are listed in Table 1.

The slurry from the prepolymerization stage was directly fed to a loop reactor. Propylene, hydrogen and ethylene were further added to the loop reactor. The polymerization conditions and feeds are listed in Table 1.

The slurry from loop reactor was introduced to a gas phase reactor via direct feed line, i.e. without monomer flashing in-between the reactors. Propylene, ethylene and hydrogen were fed to the gas phase reactor. The polymerization conditions and feeds are listed in Table 1.

In Examples Ex1 to Ex4 the low molecular weight fraction of the propylene random copolymer is polymerized in the loop reactor whereas the high molecular weight fraction of the propylene random copolymer is polymerized in the subsequent gas phase reactor in the presence of the low molecular weight fraction.

In Reference Example Ref5 the high molecular weight fraction of the propylene random copolymer is polymerized in the loop reactor whereas the low molecular weight fraction of the propylene random copolymer is polymerized in the subsequent gas phase reactor.

a) Compounding and Pipe Extrusion

The polypropylene resins of Examples Ex1 to Ex4 and Reference Example Ref5 emerging from the gas phase reactor (identified as reactor powder in Table 1) were compounded together with conventional antioxidants and Ca-stearate (same amounts were used for Examples Ex1 to Ex4 and Reference Example Ref5) and pelletized in a W&P ZSK 70 twin-screw extruder (Coperion) at a melt temperature of 240° C. and an extruder throughput of 200 kg/h.

The polymer pellets of Examples Ex1 to Ex4 and Reference Example Ref5 were prepared to test specimens for the mechanical and thermal tests as listed below in Table 2 or were extruded to pipes in order to test the processability of the compositions.

TABLE 1

Polymerization conditions of Examples Ex1-4 and Reference Example Ref5

|  | Ex1 | Ex2 | Ex3 | Ex4 | Ref5 |
| --- | --- | --- | --- | --- | --- |
| Prepolymerisation step |  |  |  |  |  |
| Cocatalyst (TEAL) feed [g/t C3] | 200 | 200 | 200 | 200 | 200 |
| Donor (DCPDMS) feed [g/t C3] | 30 | 30 | 30 | 30 | 40 |
| Temperature [° C.] | 30 | 30 | 30 | 30 | 30 |
| Pressure [kPa] | 5300 | 5300 | 5300 | 5300 | 5300 |
| Loop Reactor |  |  |  |  |  |
| Temperature [° C.] | 70 | 70 | 70 | 70 | 70 |
| Pressure [kPa] | 5300 | 5300 | 5300 | 5300 | 5300 |
| H2/C3 [mol/kmol] | 0.61 | 0.62 | 0.65 | 0.5 | 0.07 |
| C2 content [wt-% (mol %)] | 3.0 (4.4) | 3.0 (4.4) | 4.0 (5.9) | 3.0 (4.4) | 4.3 (6.3) |
| MFR2 [g/10 min] | 0.75 | 0.75 | 0.75 | 0.5 | 0.1 |
| XCS [wt %] | 5.0 | 5.0 | 7.0 | 5.0 | 7.7 |
| Split [%] | 40 | 40 | 40 | 40 | 60 |
| Gas Phase Reactor |  |  |  |  |  |
| Temperature [° C.] | 80 | 80 | 80 | 80 | 85 |
| Pressure [kPa] | 1600 | 1600 | 1600 | 1600 | 1600 |
| H2/C3 [mol/kmol] | 1.5 | 2.0 | 1.8 | 1.3 | 26 |
| C2 content (calc.) [mol %]* | 4.7 | 5.5 | 4.8 | 5.5 | 3.4 |
| XCS [wt %](calc.)* | 7.2 | 10.0 | 7.5 | 10.0 | 2.8 |
| Split | 60 | 60 | 60 | 60 | 40 |
| Final polypropylene composition** |  |  |  |  |  |
| C2 content [wt-% (mol %)] (measured) | 4.0 (5.9) | 4.5 (6.6) | 4.5 (6.6) | 4.5 (6.6) | 4.0 (5.9) |
| $MFR_2$ [g/10 min] | 0.24 | 0.29 | 0.27 | 0.22 | 0.22 |
| XCS [wt %] (measured) | 6.3 | 8.0 | 7.3 | 8.0 | 5.8 |

C2 content refers to the ethylene comonomer content;
C3 refer to the propylene monomer feed.
*calculated for the polymer polymerised in the gpr reactor (high molecular weight fraction)
**measured from final polypropylene composition after the compounding step (a) as described above

TABLE 2

Mechanical and thermal properties of Examples Ex1 to Ex4 and Reference Example Ref5

|  | Ex1 | Ex2 | Ex3 | Ex4 | Ref5 |
| --- | --- | --- | --- | --- | --- |
| $MFR_2$ (pellets) [g/10 min] | 0.24 | 0.29 | 0.27 | 0.22 | 0.22 |

TABLE 2-continued

Mechanical and thermal properties of Examples Ex1 to Ex4 and Reference Example Ref5

|  | Ex1 | Ex2 | Ex3 | Ex4 | Ref5 |
|---|---|---|---|---|---|
| Flexural modulus [MPa] | 935 | 811 | 854 | 783 | 964 |
| Charpy NIS, 23° C. [kJ/m$^2$] | 62.4 | 69.7 | 52.1 | 75.9 | 24.3 |
| Charpy NIS, 0° C. [kJ/m$^2$] | 6.9 | 11.8 | 6.5 | 9.6 | 3.6 |
| Ten. Stress (yield) [MPa] | 26.2 | 24.5 | 24.8 | 23.5 | 28.8 |
| Ten. Strain (yield) [%] | 12.8 | 12.9 | 12.9 | 14.0 | 12.7 |
| PI | 3.5 | 3.3 | 3.3 | 3.1 | 4.1 |

It can be seen from the results of Tables 2 and 3 that the Examples Ex1 to Ex4 according to the invention show an improved balance of properties in terms of flexural modulus, Charpy notched impact strength at room temperature (23° C.) and cold temperature (0° C.), tensile stress at yield and tensile strain at yield.

By comparing the properties of the examples according to the invention it can be seen that Examples Ex2 and Ex4 which have a higher amount of ethylene comonomer in the HMW fraction show a better impact performance especially at cold temperatures but also at room temperature compared to Examples Ex1 and Ex3.

Pipe Tests:

Test Pipe preparation: The polymers of Inventive Examples were extruded to pipes by using a Reifenhauser 381-1-70-30 pipe extruder. Output of the extruder was 46 to 48 kg/h, melt pressure was 180 to 220 barg and the melt temperature was 180 to 230° C. The test pipes had a diameter of 32.3 mm and wall thickness of 3 mm. The shrinkage of the produced test pipes was clearly less than 5%.

The invention claimed is:

1. A polypropylene composition suitable for pipe applications comprising:
   a propylene random copolymer with at least one comonomer selected from alpha-olefins with 2 or 4 to 8 carbon atoms,
   wherein the propylene random copolymer comprises at least (i) a propylene random copolymer fraction having a low molecular weight, which is a low molecular weight fraction, and (ii) a propylene random copolymer fraction having a high molecular weight, which is a high molecular weight fraction, wherein the weight average molecular weight of the low molecular weight fraction is lower than that of the high molecular weight fraction,
   wherein the polypropylene composition has a melt flow rate MFR$_2$ (2.16 kg, 230° C.) of 0.05 to 1.0 g/10 min, determined according to ISO 1133, a polydispersity index (PI) of 2.0 to 7.0, and a Charpy Notched Impact Strength at 0° C. of more than 6.5 kJ/m$^2$, determined according to ISO 179/1eA:2000 using notched injection moulded specimens; and
   wherein the polypropylene composition does not comprise a polymeric nucleating agent.

2. The polypropylene composition according to claim 1, wherein the propylene random copolymer does not contain an elastomeric polymer phase dispersed therein.

3. The polypropylene composition according to claim 1, wherein the polypropylene composition has a flexural modulus of at least 700 MPa, determined according to ISO 178 at a test speed of 2 mm/min and a force of 100N on test specimens having a dimension of 80×10×4.0 mm$^3$ (length× width×thickness) prepared by injection moulding according to EN ISO 1873-2.

4. The polypropylene composition according to claim 1, wherein the polypropylene composition has a tensile stress at yield of at least 15 MPa, determined according to ISO 527-2:1996 using type 1A injection moulded test specimens prepared according to ISO 527-2:1996.

5. The polypropylene composition according to claim 1, wherein the polypropylene composition has a Charpy Notched Impact Strength at 23° C. of at least 45 kJ/m$^2$, determined according to ISO 179/1eA:2000 using notched injection moulded specimens.

6. The polypropylene composition according to claim 1, wherein the polypropylene composition has a content of xylene cold solubles (XCS) of from 1.0 to 15.0 wt determined at 25° C. according to ISO 16152.

7. The polypropylene composition according to claim 1, wherein the at least one comonomer is ethylene.

8. The polypropylene composition according to claim 1, wherein the comonomer content of the propylene random copolymer is in the range of 4.5 to 9.5 mol %, based on the total content of monomeric units in the propylene random copolymer.

9. The polypropylene composition according to claim 1, wherein the propylene random copolymer having a high molecular weight fraction has a higher content of comonomer, than the propylene random copolymer having a low molecular weight fraction.

10. The polypropylene composition according to claim 1, wherein the low molecular weight fraction is present in the propylene random copolymer in an amount of 35 to 55 wt %, based on the total amount of the propylene random copolymer (100wt %), and the high molecular weight fraction is present in the propylene random copolymer in an amount of 65 to 45 wt %, based on the total amount of the propylene random copolymer (100wt %).

11. A process for producing a polypropylene composition according to claim 1, wherein the propylene random copolymer is produced in a multistage polymerization process in the presence of
   (I) a solid catalyst component comprising a magnesium halide, a titanium halide and an internal electron donor; and
   (II) a cocatalyst comprising an aluminium alkyl and optionally an external electron donor,
   the multistage process comprising the steps of
   (a) continuously polymerizing propylene together with a first comonomer selected from alpha-olefins with 2 or 4 to 8 carbon atoms, in a first polymerization stage by introducing streams of propylene, hydrogen and said first comonomer into the first polymerization stage at a temperature of 60 to 80° C. and a pressure of 3000 to 6500 kPa to produce a first propylene random copolymer, wherein said first propylene random copolymer has a melt flow rate MFR$_2$ (2.16 kg; 230° C.; ISO 1133) of from 0.2 to 3.0 g/min;
   (b) withdrawing from the first polymerization stage a stream comprising said first propylene random copolymer and transferring said stream into a second polymerization stage;
   (c) polymerizing propylene together with a second comonomer selected from alpha-olefins with 2 or 4 to 8 carbon atoms, in said second polymerization stage by introducing streams of propylene, said second comonomer and optionally hydrogen into said second polymerization stage at a temperature of 70 to 90° C. and a pressure of 1000 to 3000 kPa to produce a propylene random copolymer of said first propylene random copolymer and a second propylene random copolymer;

(d) continuously withdrawing a stream comprising said propylene random copolymer from the second polymerization stage and optionally mixing said propylene random copolymer with additives; and (e) extruding said propylene random copolymer mixture into pellets, which have a melt flow rate $MFR_2$ (2.16 kg; 230° C.; ISO 1133) of from 0.05 to 1.0 g/min.

12. A polypropylene composition according to claim 1 produced by a process for producing a polypropylene composition, wherein the propylene random copolymer is produced in a multistage polymerization process in the presence of (I) a solid catalyst component comprising a magnesium halide, a titanium halide and an internal electron donor; and (II) a cocatalyst comprising an aluminium alkyl and optionally an external electron donor, the multistage process comprising the steps of (a) continuously polymerizing propylene together with a first comonomer selected from alpha-olefins with 2 or 4 to 8 carbon atoms, in a first polymerization stage by introducing streams of propylene, hydrogen and said first comonomer into the first polymerization stage at a temperature of 60 to 80° C. and a pressure of 3000 to 6500 kPa to produce a first propylene random copolymer, wherein said first propylene random copolymer has a melt flow rate $MFR_2$ (2.16 kg; 230° C.; ISO 1133) of from 0.2 to 3.0 g/min;

(b) withdrawing from the first polymerization stage a stream comprising said first propylene random copolymer and transferring said stream into a second polymerization stage;

(c) polymerizing propylene together with a second comonomer selected from alpha-olefins with 2 or 4 to 8 carbon atoms, in said second polymerization stage by introducing streams of propylene, said second comonomer and optionally hydrogen into said second polymerization stage at a temperature of 70 to 90° C. and a pressure of 1000 to 3000 kPa to produce a propylene random copolymer of said first propylene random copolymer and a second propylene random copolymer;

(d) continuously withdrawing a stream comprising said propylene random copolymer from the second polymerization stage and optionally mixing said propylene random copolymer with additives; and (e) extruding said propylene random copolymer mixture into pellets, which have a melt flow rate $MFR_2$ (2.16 kg; 230° C.; ISO 1133) of from 0.05 to 1.0 g/m in.

13. An article comprising the polypropylene composition according to claim 1.

14. An article comprising the polypropylene composition according to claim 12.

15. The polypropylene composition according to claim 1, wherein the comonomer content of the low molecular weight fraction is 1.0 to 6.0 mol %, based on the total content of monomeric units in the low molecular weight fraction.

16. The polypropylene composition of claim 1, wherein the at least one comonomer is selected from alpha-olefins with 4 to 8 carbon atoms.

17. The process of claim 11, wherein the first comonomer is selected from alpha-olefins with 4 to 8 carbon atoms.

18. The polypropylene composition of claim 12, wherein the first comonomer is selected from alpha-olefins with 4 to 8 carbon atoms.

19. The process of claim 11, wherein the second comonomer is selected from alpha-olefins with 4 to 8 carbon atoms.

20. The polypropylene composition of claim 12, wherein the second comonomer is selected from alpha-olefins with 4 to 8 carbon atoms.

* * * * *